UNITED STATES PATENT OFFICE.

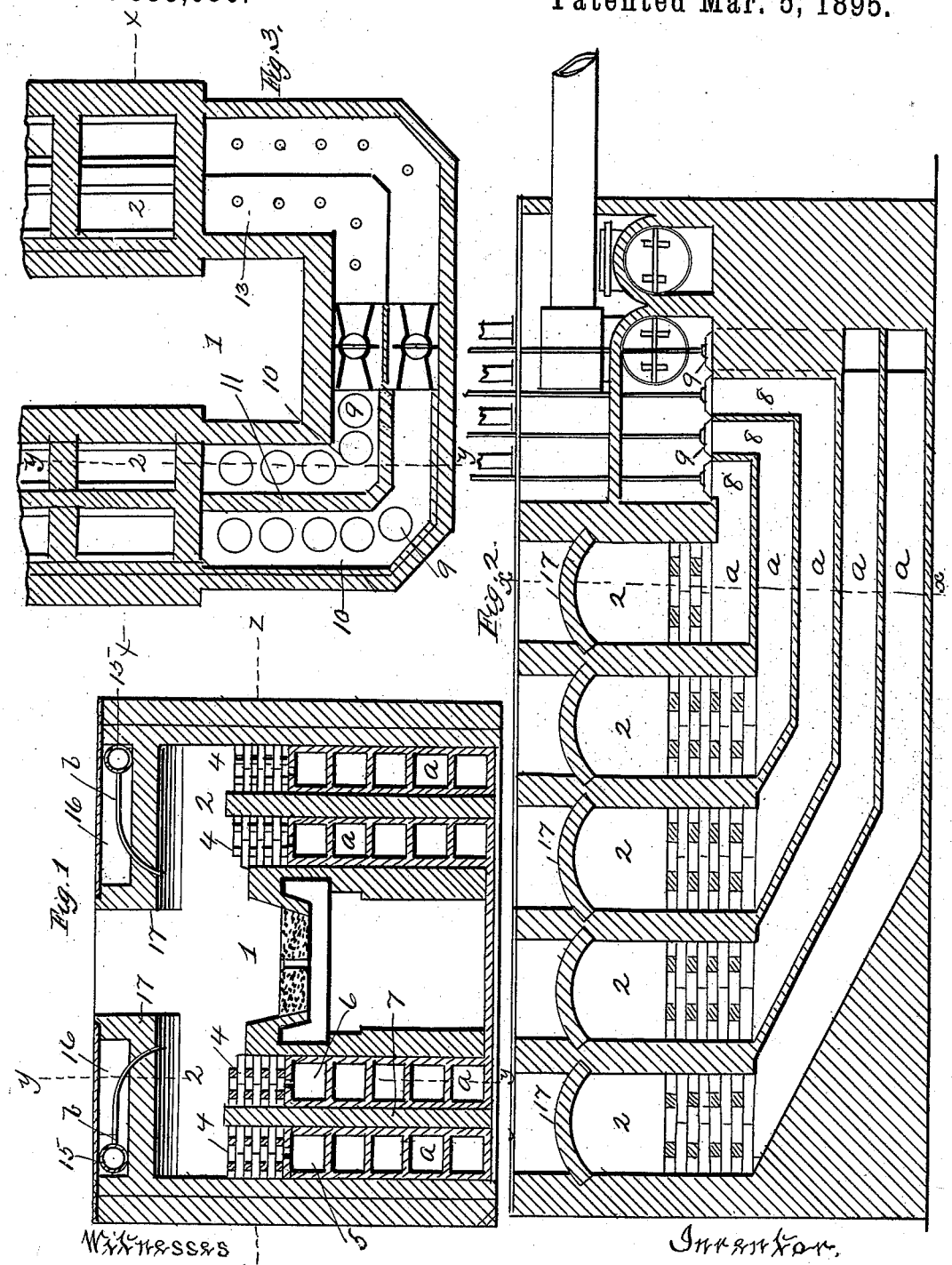

CHARLES A. TRAUTWEIN, OF PITTSBURG, PENNSYLVANIA.

PIT-FURNACE.

SPECIFICATION forming part of Letters Patent No. 535,030, dated March 5, 1895.

Application filed January 8, 1894. Serial No. 496,084. (No model.)

*To all whom it may concern:*

Be it known that I, CHARLES A. TRAUTWEIN, a citizen of the United States, residing at Pittsburg, in the county of Allegheny and State of Pennsylvania, have invented certain new and useful Improvements in Pit-Furnaces; and I do hereby declare the following to be a full, clear, and exact description of the invention, such as will enable others skilled in the art to which it pertains to make and use the same, reference being had to the accompanying drawings, which form a part of this specification.

It is the object of my invention to provide a regenerative furnace of simple form with special relation to a series of flues leading to different parts of the furnace for the introduction of air and gas and for the discharge therefrom through another series of flues all of which are independently controlled by valves so that the gas and air supply can be directed to or cut off from any part of the hearth as desired during the progress of the work.

My invention includes also a series of mixing chambers adjacent to the hearth, pipes extending adjacent to said mixing chambers and a series of nozzles leading from said pipes into the mixing chambers for introducing natural gas to the mixing chambers in case the gas producer fails.

In the drawings, Figure 1, is a transverse section through the furnace on line $x-x$ of Figs. 2 and 3. Fig. 2, a longitudinal vertical section, on line $y-y$ of Figs. 1 and 3, and Fig. 3, a sectional plan view of one end of the furnace on line $z-z$ of Fig. 1.

The hearth 1 of the furnace extends centrally and longitudinally thereof, and on each side of said hearth are the mixing chambers 2 opening into the hearth. Below these mixing chambers the ordinary checker work 4 is placed and below this checker work two series of flues are arranged side by side, the flues of each series being arranged vertically one above the other. The two series as 5 and 6 are divided by vertical partition 7 which extends also up through the checker work and divides the same into an air and gas section. The flues extend horizontally along each side of the furnace and are of different lengths to connect with the mixing chambers at different points along the furnace having for this purpose upwardly inclined sections or portions leading to the checker work. Of each horizontal pair of flues as 5 and 6, 5 is for gas while the adjacent flue 6 of the said pair is for the air supply. The upper pair of flues connects with the first mixing chamber as shown in Fig. 2, the next lower pair with the second mixing chamber and so on each successive lower pair connecting with the furnace or mixing chamber at a point farther along the furnace than the pair next above it. All of these flues extend to the end of the furnace and have upwardly extending channels 8 with ports 9 leading into the valve box 10 to which the air and gas are led through any suitable reversing valve. The box is divided by a partition 11 into an air and gas portion and each chamber has its separate set of valves for controlling the ports 9 leading to the flues so that by manipulating the valves the air and gas may be sent through any pair or pairs of flues to any point along the furnace.

The hot gas and products from the furnace pass out through the opposite mixing chamber or chambers through the checker work and flues, to the other valve box 13 and out through the reversal valve and when these discharge flues and the checker work have been hightly heated the reversal valve is operated and the producer gas and the air are fed to the furnace through these highly heated flues and checker work while the discharge takes place through the opposite flues and checker work which have now become cool so that these will be again heated for another reversal of the action.

In order to supply gas in case the producer fails or is out of action I have provided conduits 15 extending through chambers 16 above the arches 17 of the mixing chambers 2 and from these conduits the nozzles $b$ extend into the mixing chambers so that a proper supply of gas may be fed to the furnace, the air being admitted through the flues and checker work as before. The chambers 16 being at the top of the furnace will be kept hot and thus heated gas will be supplied to the mixing chambers.

I claim as my invention—

1. In combination in a regenerative furnace, the hearth, the mixing chambers arranged on each side thereof, the series of pairs of air and gas flues of different lengths extending longitudinally of the furnace each pair of flues opening into a separate mixing chamber and being unconnected with the other chambers, the valve boxes common to the series of air and gas flues and the valves for controlling the inlet to said flues whereby the air and gas from the valve box may be sent to any mixing chamber at any point along the hearth substantially as described.

2. In combination in a regenerative furnace, the hearth, the mixing chambers on each side of the same and arranged longitudinally of the furnace, and the series of pairs of air and gas flues extending lengthwise of the furnace and superimposed the one above the other leading from the air and gas supply to the mixing chambers and the valves for controlling the said flues, substantially as described.

In testimony that I claim the foregoing I hereunto affix my signature this 1st day of September, A. D. 1893.

CHARLES A. TRAUTWEIN. [L. S.]

In presence of—
ALBERT J. WALKER,
M. E. HARRISON.